(12) United States Patent
Liu et al.

(10) Patent No.: US 10,216,032 B1
(45) Date of Patent: Feb. 26, 2019

(54) COLOR FILTER SUBSTRATE AND DISPLAY DEVICE

(71) Applicants: BOE Technology Group Co., Ltd., Beijing (CN); Chongqing BOE Optoelectronics Technology Co., Ltd., Chongqing (CN)

(72) Inventors: Xin Liu, Beijing (CN); Ni Yang, Beijing (CN); Jingyu Wang, Beijing (CN); Mengqiu Liu, Beijing (CN); Hui Li, Beijing (CN); Xuefang Chen, Beijing (CN)

(73) Assignees: BOE Technology Group Co., Ltd., Beijing (CN); Chongqing BOE Optoelectronics Technology Co., Ltd., Chongqing (CN)

( * ) Notice: Subject to any disclaimer, the term of this patent is extended or adjusted under 35 U.S.C. 154(b) by 0 days.

(21) Appl. No.: 15/922,029

(22) Filed: Mar. 15, 2018

(30) Foreign Application Priority Data

Aug. 29, 2017 (CN) ..................... 2017 2 1092123 U

(51) Int. Cl.
*G02F 1/1335* (2006.01)
*G02B 5/20* (2006.01)

(52) U.S. Cl.
CPC ....... *G02F 1/133514* (2013.01); *G02B 5/201* (2013.01); *G02F 1/133512* (2013.01)

(58) Field of Classification Search
CPC ................................................ G02F 1/133512
See application file for complete search history.

(56) References Cited

U.S. PATENT DOCUMENTS

2014/0002776 A1* 1/2014 Kim ..................... G02B 5/3083
349/106
2014/0176884 A1* 6/2014 Yang ....................... G02F 1/161
349/106

* cited by examiner

*Primary Examiner* — Phu Vu
(74) *Attorney, Agent, or Firm* — McAndrews, Held & Malloy, Ltd.

(57) ABSTRACT

The disclosure discloses a color filter substrate and a display device, where the color filter substrate includes a substrate including an active area and a peripheral area, there is such a first black matrix layer on a first surface of the substrate that has a part in the active area, there is a second black matrix layer on a second surface of the substrate facing away from the first surface; and an orthographic projection of the second black matrix layer onto the second surface, and an orthographic projection of the first black matrix layer onto the second surface, after they are overlapped with each other, covers the peripheral area of the color filter substrate; and the display device includes an array substrate, a liquid crystal layer, and the color filter substrate above.

18 Claims, 5 Drawing Sheets

COLOR FILTER SUBSTRATE AND DISPLAY DEVICE

CROSS-REFERENCE TO RELATED APPLICATION

This Application claims priority to Chinese Patent Application No. 201721092123.8, filed on Aug. 29, 2017, the content of which is incorporated by reference in the entirety.

TECHNICAL FIELD

The present disclosure relates to the field of display technologies, and particularly to a color filter substrate and a display device.

DESCRIPTION OF THE RELATED ART

As the display devices are advancing constantly, consumers pay more attention to and have a growing demand for advanced display devices, particularly a display device with a high Pixels Per Inch (PPI) and a narrow frame. And respective Thin Film Transistor-Liquid Crystal Display (TFT-LCD) manufacturers keep on improving their designs and processes to thereby satisfy the demand of the consumers; and also in order to save a cost, they keep on optimizing their designs, and the Gate driver On Array (GOA) product is a design for saving the cost.

A black matrix layer in a display device is charged, so that the display device may display abnormally, which is a significant problem in the liquid crystal display product, and in the related art, this problem has been alleviated from the perspectives of its design in that the black matrix layer in the display device is designed with a non-straight edge, where the edge of the black matrix layer is designed in segments. However a shorter distance between the black matrix layer and an Active Area (AA) of the display device is required for the advanced display device, so the existing demand fails to be satisfied by the original design, and the black matrix layer still tends to be charged so that an image tends to be displayed abnormally in the active area, thus seriously degrading the quality of the product. Moreover when a backlight source operates with the black matrix layer with the non-straight edge designed in segments, light tends to be leaked at the edge of the display device; and the black matrix layer tends to be coupled with a part of GOA CLK signal lines so that the display device may display poorly.

SUMMARY

Embodiments of the disclosure provide a color filter substrate and a display device.

In an aspect, an embodiment of the disclosure provides a color filter substrate, the color filter substrate includes: a substrate including an active area, and a peripheral area around the active area, wherein there is such a first black matrix layer on a first surface of the substrate that has a part in the active area, the first black matrix layer is arranged with opening areas corresponding to pixel elements in a one-to-one manner, and an orthographic projection of the first black matrix layer onto the first surface of the substrate does not fully cover the peripheral area, and an uncovered area thereof is a closed annular area; and there is a second black matrix layer on a second surface of the substrate facing away from the first surface, an orthographic projection of the second black matrix layer onto the second surface covers an orthographic projection of the closed annular area onto the second surface, the orthographic projection of the second black matrix layer onto the second surface overlaps partially with an orthographic projection of the first black matrix layer onto the second surface; and the orthographic projection of the second black matrix layer onto the second surface, and the orthographic projection of the first black matrix layer onto the second surface, after they are overlapped with each other, covers the peripheral area of the color filter substrate.

In another aspect, an embodiment of the disclosure further provides a display device including an array substrate, a liquid crystal layer, and a color filter substrate according to the embodiment of the disclosure above, wherein the color filter substrate is located on a side of the liquid crystal layer facing away from the array substrate.

BRIEF DESCRIPTION OF THE DRAWINGS

In order to make the technical solutions according to the embodiments of the disclosure more apparent, the drawings to which a description of the embodiments refers will be briefly introduced below, and apparently the drawings to be described below are merely illustrative of some of the embodiments of the disclosure, and those ordinarily skilled in the art can derive from these drawings other drawings without any inventive effort.

DETAILED DESCRIPTION OF THE EMBODIMENTS

The technical solutions according to the embodiments of the disclosure will be described below clearly and fully with reference to the drawings in the embodiments of the disclosure, and apparently the embodiments described below are only a part but not all of the embodiments of the disclosure.

Based upon the embodiments here of the disclosure, all the other embodiments which can occur to those ordinarily skilled in the art without any inventive effort shall fall into the scope of the disclosure.

Figure 4A:
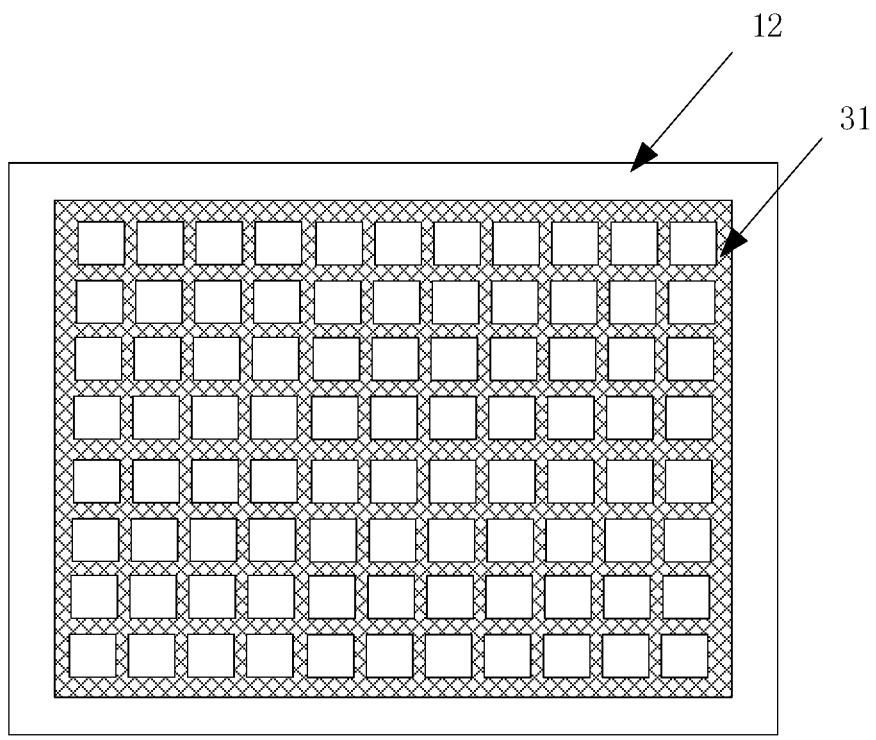
FIG. 4A is a horizontal sectional view of a design of a black matrix layer according to an embodiment of the disclosure.
Figure 4B:
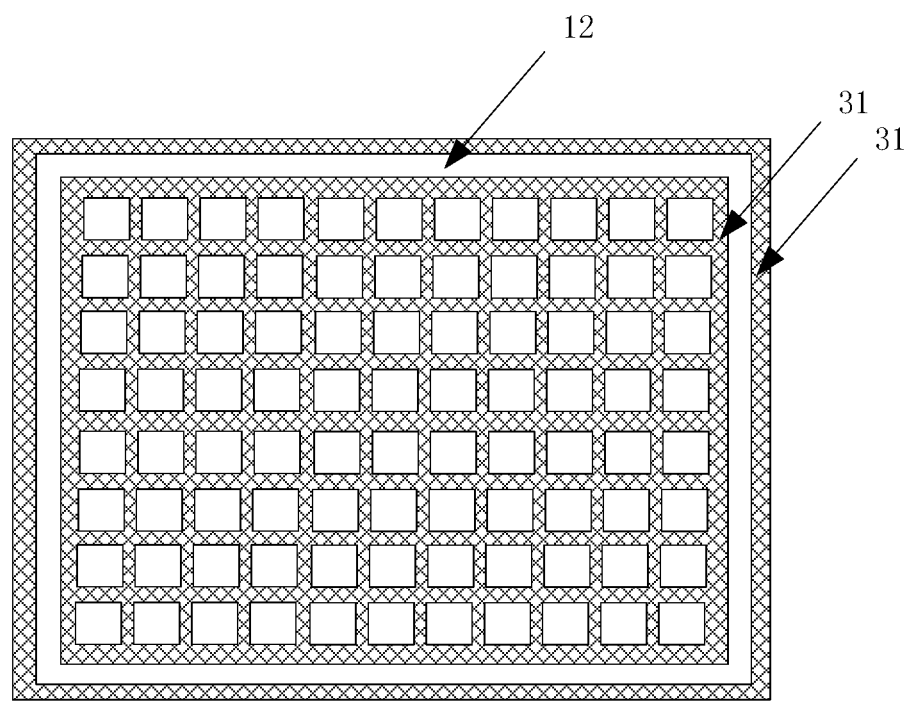
FIG. 4B is a horizontal sectional view of another design of the black matrix layer according to an embodiment of the disclosure.

Embodiments of the disclosure provide a color filter substrate, as illustrated in FIG. 2A, FIG. 2B, FIG. 2C and FIG. 2D, the color filter substrate includes a substrate 2 including an active area, and a peripheral area around the active area, where there is such a first black matrix layer 31 on a first surface of the substrate 2 that has a part in the active area, the first black matrix layer 31 is arranged with opening areas corresponding to pixel elements in a one-to-one manner, and an orthographic projection of the first black matrix layer 31 onto the first surface of the substrate 2 does not fully cover the peripheral area, and an uncovered area thereof is a closed annular area 12, as illustrated in FIG. 4A and FIG. 4B; and there is a second black matrix layer 32 on a second surface of the substrate 2 facing away from the first surface, an orthographic projection of the second black matrix layer 32 onto the second surface covers an orthographic projection of the closed annular area 12 onto the second surface, the orthographic projection of the second black matrix layer 32 onto the second surface overlaps partially with an orthographic projection of the first black matrix layer 31 onto the second surface; and the orthographic projection of the second black matrix layer 32 onto the second surface, and the orthographic projection of the first black matrix layer 31 onto the second surface, after they are overlapped with each other, covers the peripheral area of the color filter substrate.

In the embodiments of the disclosure, the closed annular area 12 is arranged at the edge of the substrate 12 to thereby prevent in effect the first black matrix layer 31 from being charged, which would otherwise cause an image to be displayed abnormally in the active area; and the substrate 2 has the first surface provided with the first black matrix layer 31, and the second surface provided with the second black matrix layer 32, the orthographic projection of the second black matrix layer 32 onto the second surface covers the orthographic projection of the closed annular area 12 onto the second surface, the orthographic projection of the second black matrix layer 32 onto the second surface overlaps partially with the orthographic projection of the first black matrix layer 31 onto the second surface; and the orthographic projection of the second black matrix layer 32 onto the second surface, and the orthographic projection of the first black matrix layer 31 onto the second surface, covers the peripheral area of the color filter substrate, after they are overlapped with each other, so the projections overlap so that there is no risk of leaking light in the peripheral area of the color filter substrate, thus enhancing an effect of shielding light in such a design.

Figure 2A:
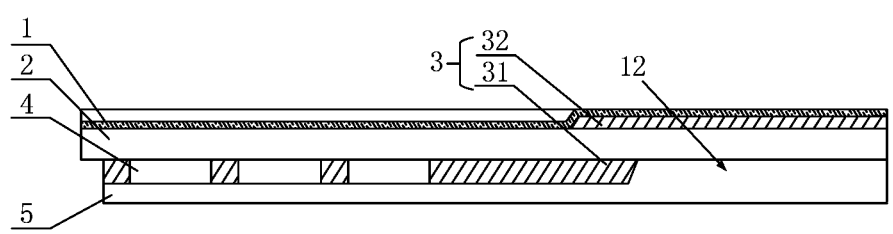
FIG. 2A is a longitudinal sectional view of a first color filter substrate according to an embodiment of the disclosure.
Figure 2B:
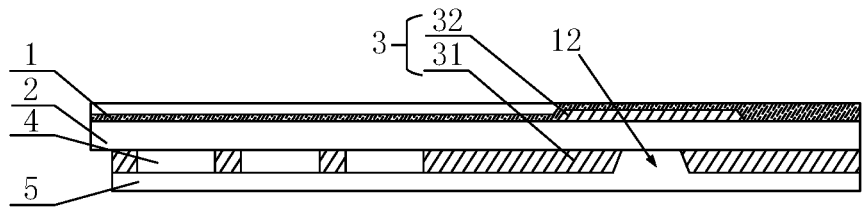
FIG. 2B is a longitudinal sectional view of a second color filter substrate according to an embodiment of the disclosure.
Figure 2C:
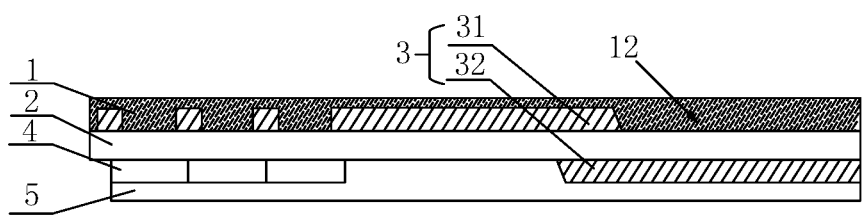
FIG. 2C is a longitudinal sectional view of a third color filter substrate according to an embodiment of the disclosure.

In some embodiments, as illustrated in FIG. 2A and FIG. 2C, the closed annular area 12 is located outside the first black matrix layer 31, an orthographic projection of the second black matrix layer 32 onto the first surface has a closed annular structure, and covers the closed annular area 12, and an inner edge of the orthographic projection of the second black matrix layer 32 onto the first surface overlaps with an outer edge of the orthographic projection of the first black matrix layer 31 onto the first surface.

Figure 2D:
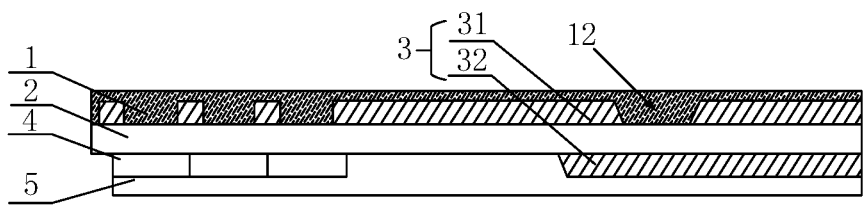
FIG. 2D is a longitudinal sectional view of a fourth color filter substrate according to an embodiment of the disclosure.
Figure 3A:
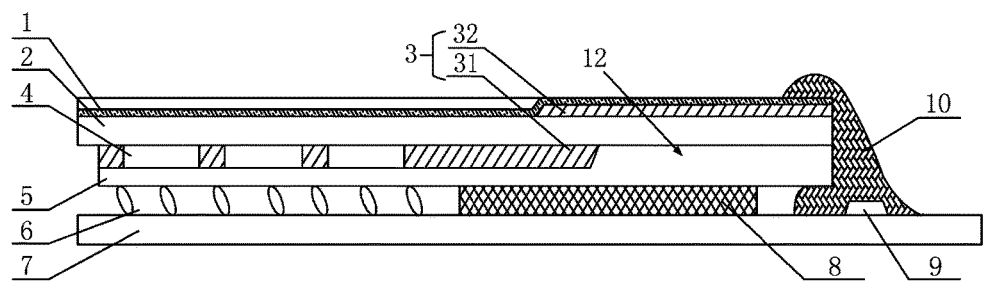
FIG. 3A is a longitudinal sectional view of a display device including the first filter substrate according to an embodiment of the disclosure.
Figure 3B:
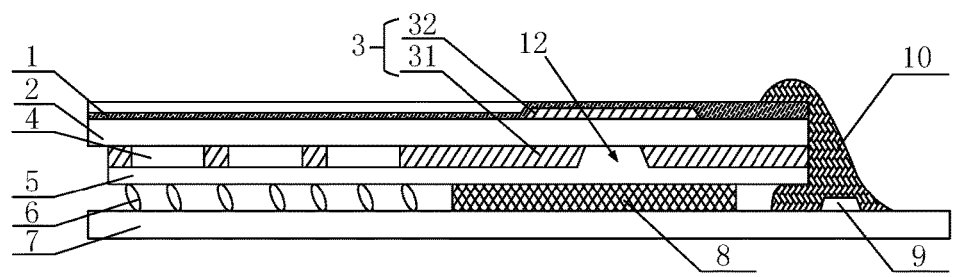
FIG. 3B is a longitudinal sectional view of a display device including the second filter substrate according to an embodiment of the disclosure.
Figure 3C:
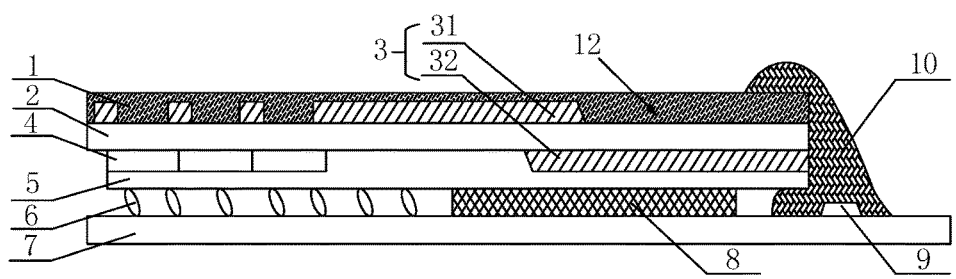
FIG. 3C is a longitudinal sectional view of a display device including the third filter substrate according to an embodiment of the disclosure.
Figure 3D:
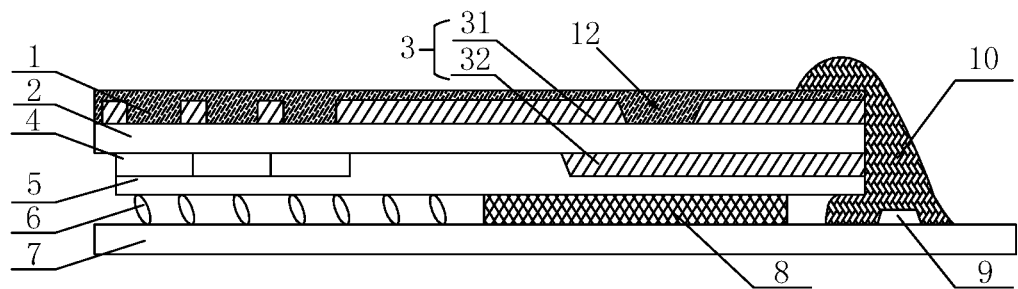
FIG. 3D is a longitudinal sectional view of a display device including the fourth filter substrate according to an embodiment of the disclosure.

In some embodiments, as illustrated in FIG. 2B and FIG. 2D, the closed annular area 12 is located in an edge area of the first black matrix layer 31, the first black matrix layer 31 includes a central part located inside the closed annular area 12, and an edge part located outside the closed annular area 12, an orthographic projection of the second black matrix layer 32 onto the first surface has a closed annular structure, and covers the closed annular area 12, an inner edge of the orthographic projection of the second black matrix layer 32 onto the first surface overlaps with an outer edge of an orthographic projection of the central part onto the first surface, and an outer edge of the orthographic projection of the second black matrix layer 32 onto the first surface overlaps with an inner edge of an orthographic projection of the edge part onto the first surface.

In the embodiments of the disclosure, when the closed annular area 12 is located outside the first black matrix layer 31, the orthographic projections of the second black matrix layer 32 and the first black matrix layer 31 onto the first surface of the substrate 2 overlap, and in this case, the projection of the black matrix layer 3 covers the entire edge of the color filter substrate, thus alleviating the color filter substrate from a risk of leaking light; and when the closed annular area 12 is located in the edge area of the first black matrix layer 31, the first black matrix layer 31 includes the central part located inside the closed annular area 12, and the edge part located outside the closed annular area 12, the orthographic projections of the second black matrix layer 32 and the first black matrix layer 31 onto the first surface of the substrate 2 overlap, and in this case, the projection of the black matrix layer 3 covers the entire edge of the color filter substrate, thus alleviating the color filter substrate from a risk of leaking light.

In some embodiments, as illustrated in FIG. 2A and FIG. 2B, there is a color filter layer 4 arranged on the first surface of the substrate 2, and the color filter layer 4 is arranged in the opening areas arranged at the first black matrix layer 31.

In some embodiments, as illustrated in FIG. 2C and FIG. 2D, there is a color filter layer 4 located on the second surface of the substrate 2, and an orthographic projection of the color filter layer 4 onto the first surface covers the opening areas arranged at the first black matrix layer 31.

In the color filter substrate above according to the embodiments of the disclosure, when the color filter layer 4 is located on the first surface of the substrate 2, the color filter layer 4 is arranged in the opening areas arranged at the first black matrix layer 31, and when the color filter layer 4 is arranged on the second surface of the substrate 2, the orthographic projection of the color filter layer 4 onto the first surface covers the opening areas arranged at the first black matrix layer 31, so that this design can prevent the color filter layer 4 from being shielded by the first black matrix layer 31 or the second black matrix layer 32, so as to enable light to be transmitted therethrough.

In some embodiments, when the color filter layer 4 is located on the first surface of the substrate 2, there is a first protective layer 1 arranged on a side of the second black matrix layer 32 facing away from the substrate 2, and the first protective layer 1 covers the second black matrix layer 32, as illustrated in FIG. 2A and FIG. 2B.

In some embodiments, when the color filter layer 4 is located on the second surface of the substrate 2, there is a first protective layer 1 arranged on a side of the first black matrix layer 31 facing away from the substrate 2, and the first protective layer 1 covers the first black matrix layer 31, as illustrated in FIG. 2C and FIG. 2D.

In the color filter substrate above according to the embodiments of the disclosure, the protective layer can be arranged to protect the second black matrix layer 32 or the first black matrix layer 31 from a risk of being scratched.

In some embodiments, the first protective layer 1 is a transparent conductive layer.

In the color filter substrate above according to the embodiments of the disclosure, the first protective layer 1 is the transparent conductive layer, so the first protective layer 1 made of a transparent conductive material can enable light transmitted through the color filter layer 4 to be well displayed, and the first protective layer 1 made of the transparent conductive material can be grounded to thereby be free of interference.

In some embodiments, as illustrated in FIG. 2A, when the color filter layer 4 is located on the first surface of the substrate 2, and the closed annular area 12 is located outside the first black matrix layer 31, the second black matrix layer 32 is conductive, and the first protective layer 1 and the second black matrix layer 32 are grounded together.

In some embodiments, as illustrated in FIG. 2B, when the color filter layer 4 is located on the first surface of the substrate 2, and the closed annular area 12 is located in the edge area of the first black matrix layer 31, the first protective layer 1, the second black matrix layer 32, and the edge part of the first black matrix layer 31 are grounded together.

In some embodiments, as illustrated in FIG. 2C, when the color filter layer 4 is located on the second surface of the substrate 2, and the closed annular area 12 is located outside the first black matrix layer 31, the first protective layer 1 and the second black matrix layer 32 are grounded together.

In some embodiments, as illustrated in FIG. 2D, when the color filter layer 4 is located on the second surface of the substrate 2, and the closed annular area 12 is located in the edge area of the first black matrix layer 31, the first protective layer 1, the second black matrix layer 32, and the edge part of the first black matrix layer 31 are grounded together.

Figure 1:
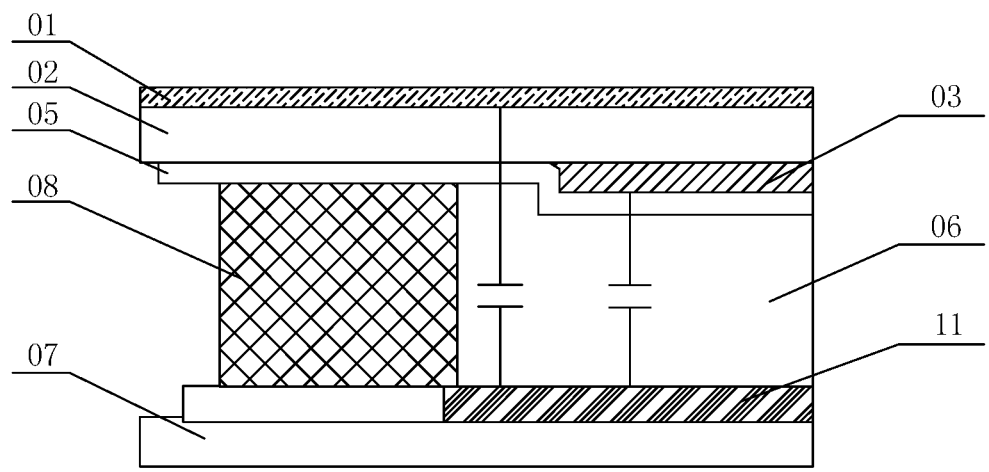
FIG. 1 is a sectional view of a peripheral design of a GOA display device in the related art.

In some embodiments, as illustrated in FIG. 2A, when the color filter layer 4 is located on the first surface of the substrate 2, and the closed annular area 12 is located outside the first black matrix layer 31, the first black matrix layer 31 at the same layer as the color filter layer 4 is away from the edge of the color filter substrate, and thus prevented in effect from being charged, which would otherwise cause the color filter layer 4 to appear significantly greenish, thus avoiding an image from being displayed abnormally; and the distance between the first black matrix layer 31, and the edge of the color filter substrate can be set in a design as needed for the product to thereby accommodate a desirable design with a narrow frame, and guarantee the performance of the color filter substrate. FIG. 1 is a sectional view of a peripheral design of a GOA display device in the related art, where a first protective layer 01 covers a substrate 02, a black matrix layer 03 is located between the substrate 02 and a second protective layer 05, and proximate to an edge; a liquid crystal layer 06 and a sealant layer 08 are located at the same layer, and between the second protective layer 05, and GOA clock (CLK) signal lines 11 proximate to the edge; and an array substrate 07 is located on a side of the GOA CLK signal lines 11 facing away from the liquid crystal layer 06. In the GOA product, the GOA CLK signal lines are designed to be located at the edge of the display device, so they are limited to the edge of the display device, and thus a part of the GOA CLK signal lines may tend to be coupled with the black matrix layer, as illustrated in FIG. 1, thus resulting in a difference between the GOA CLK signal lines, and consequently displaying an image poorly. In the embodiments of the disclosure, the first black matrix layer 31 and the second black matrix layer 32 are farther apart from the GOA CLK signal lines 11, thus avoiding in effect the GOA CLK signal lines 11 from being coupled with the first black matrix layer 31 or the second black matrix layer 32, which would otherwise result in such a difference between the GOA CLK signal lines 11 that may come with horizontal lines, so that there will be a better display effect. Further, the second black matrix layer 32 is conductive, and the first protective layer 1 and the second black matrix layer 32 are grounded together, thus securing and stabilizing the display device.

In some embodiments, as illustrated in FIG. 2B, when the color filter layer 4 is located on the first surface of the substrate 2, and the closed annular area 12 is located in the edge area of the first black matrix layer 31, the central part of the first black matrix layer 31 is away from the edge of the color filter substrate, and thus prevented in effect from being charged, which would otherwise cause the color filter layer 4 to appear significantly greenish, thus avoiding an image from being displayed abnormally; and the first protective layer 1, the second black matrix layer 32, and the edge part of the first black matrix layer 31 are grounded together, thus securing and stabilizing the display device.

In some embodiments, as illustrated in FIG. 2C, when the color filter layer 4 is located on the second surface of the substrate 2, and the closed annular area 12 is located outside the first black matrix layer 31, the second black matrix layer 32 at the same layer as the color filter layer 4 is not connected directly with the color filter layer 4, thus preventing in effect the color filter layer 4 from appear significantly greenish, so as to avoid an image from being displayed abnormally; and the first protective layer 1 and the second black matrix layer 32 are grounded together, thus securing and stabilizing the display device.

In some embodiments, as illustrated in FIG. 2D, when the color filter layer 4 is located on the second surface of the substrate 2, and the closed annular area 12 is located in the edge area of the first black matrix layer 31, the second black matrix layer 32 at the same layer as the color filter layer 4 is not connected directly with the color filter layer 4, thus preventing in effect the color filter layer 4 from appear significantly greenish, so as to avoid an image from being displayed abnormally; and the first protective layer 1, the second black matrix layer 32, and the edge part of the first black matrix layer 31 are grounded together, thus securing and stabilizing the display device.

In some embodiments, there is a second protective layer 5 arranged on a side of the color filter layer 4 facing away from the substrate 2.

The second protective layer 5 can be arranged to thereby protect the color filter layer 4, and also the second protective layer 5 can play a role of planarizing to thereby guarantee the uniformity of thickness of the color filter substrate.

Based upon a same inventive concept, embodiments of the disclosure further provide a display device as illustrated in FIG. 3A, FIG. 3B, FIG. 3C, and FIG. 3D, which includes an array substrate 7, a liquid crystal layer 6, and the color filter substrate according to any one of the embodiments of the disclosure above, where the color filter substrate is arranged on a side of the liquid crystal layer 6 facing away from the array substrate 7.

In some embodiments, when the color filter substrate includes the first protective layer 1, there is a grounded metal line 9 arranged on a surface of the array substrate 7 facing the color filter substrate, and the first protective layer 1 is electrically connected with the grounded metal line 9.

In the display device according to the embodiments of the disclosure above, the grounded metal line 9 is arranged on the surface of the array substrate 7 facing the color filter substrate, so that it is convenient for the first protective layer 1 to be electrically connected with the grounded metal line 9, and thus grounded.

In some embodiments, when the color filter substrate is arranged with the second protective layer 5, there is a sealant layer 8, distributed around the liquid crystal layer 6, arranged between the second protective layer 5 and the array substrate 7.

In the display device according to the embodiments of the disclosure above, the sealant layer 8 is arranged to fix liquid crystal in position to thereby avoid the liquid crystal from contacting the edge of the display device, and thus being charged.

Evidently those skilled in the art can make various modifications and variations to the disclosure without departing from the spirit and scope of the disclosure. Thus the disclosure is also intended to encompass these modifications and variations thereto so long as the modifications and variations come into the scope of the claims appended to the disclosure and their equivalents.

The invention claimed is:

1. A color filter substrate, comprising a substrate comprising an active area, and a peripheral area around the active area, wherein there is such a first black matrix layer on a first surface of the substrate that has a part in the active area, the first black matrix layer is arranged with opening areas corresponding to pixel elements in a one-to-one manner, and an orthographic projection of the first black matrix layer onto the first surface of the substrate does not fully cover the peripheral area, and an uncovered area thereof is a closed annular area; and there is a second black matrix layer on a second surface of the substrate facing away from the first surface, an orthographic projection of the second black matrix layer onto the second surface covers an orthographic projection of the closed annular area onto the second surface, the orthographic projection of the second black matrix layer onto the second surface overlaps partially with an orthographic projection of the first black matrix layer onto the second surface; and the orthographic projection of the second black matrix layer onto the second surface, and the orthographic projection of the first black matrix layer onto the second surface, after they are overlapped with each other, covers the peripheral area of the color filter substrate.

2. The color filter substrate according to claim 1, wherein the closed annular area is located outside the first black matrix layer, an orthographic projection of the second black matrix layer onto the first surface has a closed annular structure, and covers the closed annular area, and an inner edge of the orthographic projection of the second black matrix layer onto the first surface overlaps with an outer edge of the orthographic projection of the first black matrix layer onto the first surface.

3. The color filter substrate according to claim 1, wherein the closed annular area is located in an edge area of the first black matrix layer, the first black matrix layer comprises a central part located inside the closed annular area, and an edge part located outside the closed annular area, an orthographic projection of the second black matrix layer onto the first surface has a closed annular structure, and covers the closed annular area, an inner edge of the orthographic projection of the second black matrix layer onto the first surface overlaps with an outer edge of an orthographic projection of the central part onto the first surface, and an outer edge of the orthographic projection of the second black matrix layer onto the first surface overlaps with an inner edge of an orthographic projection of the edge part onto the first surface.

4. The color filter substrate according to claim 1, wherein there is a color filter layer arranged on the first surface of the substrate, and the color filter layer is arranged in the opening areas arranged at the first black matrix layer.

5. The color filter substrate according to claim 4, wherein when the color filter layer is located on the first surface of the substrate, there is a first protective layer arranged on a side of the second black matrix layer facing away from the substrate, and the first protective layer covers the second black matrix layer.

6. The color filter substrate according to claim 5, wherein the first protective layer is a transparent conductive layer.

7. The color filter substrate according to claim 6, wherein when the color filter layer is located on the first surface of the substrate, and the closed annular area is located outside the first black matrix layer, the second black matrix layer is conductive, and the first protective layer and the second black matrix layer are grounded together.

8. The color filter substrate according to claim 6, wherein when the color filter layer is located on the first surface of the substrate, and the closed annular area is located in an edge area of the first black matrix layer, the first protective layer, the second black matrix layer, and an edge part of the first black matrix layer are grounded together.

9. The color filter substrate according to claim 1, wherein there is a color filter layer arranged on the second surface of the substrate, and an orthographic projection of the color filter layer onto the first surface covers the opening areas arranged at the first black matrix layer.

10. The color filter substrate according to claim 9, wherein when the color filter layer is located on the second surface of the substrate, there is a first protective layer arranged on a side of the first black matrix layer facing away from the substrate, and the first protective layer covers the first black matrix layer.

11. The color filter substrate according to claim 10, wherein the first protective layer is a transparent conductive layer.

12. The color filter substrate according to claim 11, wherein when the color filter layer is located on the second surface of the substrate, and the closed annular area is located outside the first black matrix layer, the first protective layer and the second black matrix layer are grounded together.

13. The color filter substrate according to claim 11, wherein when the color filter layer is located on the second surface of the substrate, and the closed annular area is located in an edge area of the first black matrix layer, the first protective layer, the second black matrix layer, and the first black matrix layer are grounded together.

14. The color filter substrate according to claim 2, wherein there is a second protective layer arranged on a side of the color filter layer facing away from the substrate.

15. The color filter substrate according to claim 3, wherein there is a second protective layer arranged on a side of the color filter layer facing away from the substrate.

16. A display device, comprising an array substrate, a liquid crystal layer, and the color filter substrate according to claim 1, wherein the color filter substrate is arranged on a side of the liquid crystal layer facing away from the array substrate.

17. The display device according to claim 16, wherein when the color filter substrate comprises a first protective layer, there is a grounded metal line arranged on a surface of the array substrate facing the color filter substrate, and the first protective layer is electrically connected with the grounded metal line.

18. The display device according to claim 16, wherein when the color filter substrate is arranged with a second protective layer, there is a sealant layer, distributed around the liquid crystal layer, arranged between the second protective layer and the array substrate.

* * * * *